US012747140B2

(12) United States Patent
Perkins, II et al.

(10) Patent No.: US 12,747,140 B2
(45) Date of Patent: Sep. 29, 2026

(54) CRANE STABILIZER PAD SYSTEM AND METHODS

(71) Applicant: RAPTOR TECH, INC., Downers Grove, IL (US)

(72) Inventors: Paul S. Perkins, II, Downers Grove, IL (US); Timothy Smith, Downers Grove, IL (US)

(73) Assignee: Raptor Tech, Inc., Downers Grove, IL (US)

( * ) Notice: Subject to any disclaimer, the term of this patent is extended or adjusted under 35 U.S.C. 154(b) by 254 days.

(21) Appl. No.: 18/590,779

(22) Filed: Feb. 28, 2024

(65) Prior Publication Data

US 2024/0286876 A1 Aug. 29, 2024

Related U.S. Application Data

(60) Provisional application No. 63/487,301, filed on Feb. 28, 2023.

(51) Int. Cl.
*B66C 23/78* (2006.01)

(52) U.S. Cl.
CPC .................................... *B66C 23/78* (2013.01)

(58) Field of Classification Search
CPC ..... B66C 23/78; E02D 27/44; B65D 19/0004; B65D 19/0002; B65D 19/36; B65D 71/70; B65D 21/0215; B65D 21/0216; B65D 2519/00786; B65D 2519/0097; B65D 2519/00975; B65D 2519/00368; B65D 2519/00492; B65D 2519/00542; B65D 2519/00935; B65D 2519/00955; B65D 2519/00776; B65D 2519/0082; F16M 9/00
See application file for complete search history.

(56) References Cited

U.S. PATENT DOCUMENTS

| | | | | | |
|---|---|---|---|---|---|
| 3,065,987 | A * | 11/1962 | Elsner | B65D 19/38 | 294/67.4 |
| 3,239,265 | A * | 3/1966 | Scibilia | B66C 1/12 | 294/67.4 |
| 3,521,764 | A * | 7/1970 | Loomis | B65D 21/0209 | 206/509 |
| 4,915,033 | A * | 4/1990 | Bond | B65D 19/44 | 108/55.1 |
| 5,092,252 | A * | 3/1992 | Gillhart | B65D 19/0028 | 108/55.3 |
| 6,026,553 | A * | 2/2000 | Brunelle | B65D 21/0209 | 206/509 |
| 6,598,540 | B2 * | 7/2003 | Austin | B65D 19/44 | 108/51.11 |
| 7,044,066 | B1 * | 5/2006 | Miller | B65D 19/44 | 108/55.3 |
| 7,780,140 | B1 * | 8/2010 | Ward | E02D 27/44 | 248/678 |

(Continued)

FOREIGN PATENT DOCUMENTS

WO WO-2017069697 A1 * 4/2017 ......... B65D 19/0075

*Primary Examiner* — Eret C Mcnichols
(74) *Attorney, Agent, or Firm* — Allison M. Corder, Esq.

(57) ABSTRACT

A stabilizer pad or crane mat comprising lifting components configured to cooperate with, guide into position, and securely hold a strap or rod used to lift or hoist the pad, and stacking components configured to cooperate with, guide into position, and securely hold an accompanying stabilizer pad when stacked together.

13 Claims, 13 Drawing Sheets

Detail A

(56) References Cited

U.S. PATENT DOCUMENTS

| | | | | |
|---|---|---|---|---|
| 7,810,861 | B1 * | 10/2010 | Heinrichs | B66C 1/16<br>294/67.4 |
| 7,934,885 | B2 * | 5/2011 | Fournier | E01C 9/086<br>404/35 |
| 8,418,632 | B2 * | 4/2013 | Linares | B65D 19/0018<br>108/57.25 |
| 8,419,095 | B2 * | 4/2013 | McAfee | B65D 19/38<br>294/67.4 |
| 8,485,754 | B2 * | 7/2013 | Bathelt | E01C 9/086<br>404/35 |
| 9,254,821 | B2 * | 2/2016 | Koberg | B60S 9/02 |
| 9,447,643 | B2 * | 9/2016 | Jack | E02D 27/36 |
| 9,550,657 | B2 * | 1/2017 | Koberg | E02F 9/085 |
| 9,714,487 | B2 * | 7/2017 | Penland, Jr. | B32B 15/18 |
| 10,046,884 | B1 * | 8/2018 | Erschen | B65D 19/385 |
| 10,086,973 | B2 * | 10/2018 | Nussbaum | B65D 19/0012 |
| 10,189,601 | B2 * | 1/2019 | Grutt | B65D 19/40 |
| 10,233,059 | B1 * | 3/2019 | Anzola | E02D 27/44 |
| 10,273,639 | B2 * | 4/2019 | Penland, Jr. | B32B 15/095 |
| 10,961,017 | B2 * | 3/2021 | Perkins, II | B65D 19/0012 |
| 11,136,165 | B1 * | 10/2021 | Heinzmann | B65D 19/0018 |
| 11,459,221 | B2 * | 10/2022 | Levasseur | B66F 9/063 |
| 11,460,149 | B2 * | 10/2022 | Carpenter | F24F 13/32 |
| 12,209,378 | B2 * | 1/2025 | Perkins, II | B66C 23/78 |
| 2009/0072525 | A1 * | 3/2009 | Banks | B66C 23/78<br>248/188.8 |
| 2016/0362847 | A1 * | 12/2016 | Penland, Jr. | B32B 21/045 |
| 2020/0130889 | A1 * | 4/2020 | Perkins, II | F16M 11/24 |
| 2024/0286876 | A1 * | 8/2024 | Perkins, II | B66C 23/78 |
| 2025/0042609 | A1 * | 2/2025 | Kujawa | B65D 19/0028 |
| 2026/0042573 | A1 * | 2/2026 | Vinke | B65D 19/38 |

* cited by examiner

Detail A

Detail A

Detail A

Detail B

Detail C

Detail D

Detail E

Detail F

Detail F

Detail G

CRANE STABILIZER PAD SYSTEM AND METHODS

REFERENCE TO RELATED APPLICATIONS

This application claims the benefit of U.S. Provisional Patent Application 63/487,301 filed Feb. 28, 2023, incorporated by reference.

FIELD OF THE INVENTION

The invention relates generally to the field of construction and more particularly, to construction equipment. The invention is directed to a stabilizer pad, otherwise referred to as “crane mats”, that provide a stable foundation to support equipment—e.g., cranes, outriggers, utility trucks—during use such as overhead lifting. The pad also protects the ground (surface, buried utilities and area below) on which the equipment is placed.

BACKGROUND OF THE INVENTION

Stabilizer mats are used with equipment such as cranes or other vehicles with outriggers or trucks. A stabilizer mat is used to stabilize the equipment and protect the ground on which the equipment is placed. The term “ground” refers to its surface and area below. The mat stabilizes the equipment during use to prevent the equipment from moving, e.g., sinking into the ground, toppling over, etc. The mat prevents the equipment from breaking through the ground—brick, rock, concrete, asphalt, sand, soil—and disrupting the ground surface, or damaging equipment or utilities below.

Stabilizer mats are used to provide a solid, even surface creating a steady base during equipment operation. Stabilizer mats distribute the weight of the equipment across the surface of the mat.

Stabilizer mats may be manufactured from various materials, including but not limited to natural materials, composites, steel, aluminum, and any variation or combination thereof.

Crane mats are extremely heavy making it difficult to move them. A plurality of mats may be stacked and hoisted using a choker or sling that attaches to features for lifting the mat. However, current lifting features are not ideal. For example, U.S. Pat. No. 10,233,059 includes lifting features recessed in the sides of the mat which restricts or inhibits access to them. This makes it difficult for a user to attach the choker or sling. Additionally, the recessed portions reduce the surface area of the platform that distributes the load which may compromise the integrity and performance of the stabilizer mat.

Stabilizer pads may be extremely heavy and weigh hundreds of pounds. Operator safety is at risk when moving or positioning stabilizer pads. What is needed is an improved crane mat system and method for moving and positioning crane mats. The invention satisfies this need.

SUMMARY OF THE INVENTION

The invention is directed to a stabilizer pad or crane mat with features to permit a secure relationship with a strap or rod for hoisting or lifting the pad or a plurality of pads. The invention is further directed to a stabilizer pad or crane mat with features so that multiple pads may be securely stacked and moved together. The features of the invention may be used with any size pad, even large sizes with heavy weight, so that they can be easily handled.

The stabilizer pad of the invention includes lifting components that are used to cooperate with, guide into position, and securely hold a strap or rod used to hoist the pad. The lifting components are configured to work with one another when multiple pads are stacked upon each other.

The lifting components may be positioned on the side surface of the pad and used to encapsulate a strap preventing it from becoming loose and falling off the mat. The lifting components may also protect the strap from damage such as abrasions, fraying, or cutting.

Alternatively, the lifting components may be centrally located and positioned through the top and bottom surfaces of the mat and used to encapsulate and securely interconnect with a lifting rod.

The stabilizer pad of the invention further includes stacking components that are used to cooperate with, guide into position, and securely hold an accompanying stabilizer pad. The stacking components include modular components configured to be “nested” together—i.e., placed or stored one inside the other. The stacking components assist with aligning the mats when stacking pads together. Furthermore, the stacking components may be used to align the lifting components to ensure proper placement/routing of the strap or rod within the lifting component.

The invention eases lifting tasks associated with transporting and positioning stabilizer pads and may reduce the incidence of user injuries.

The invention and its attributes and advantages will be further understood and appreciated with reference to the accompanying drawings.

BRIEF DESCRIPTION OF DRAWINGS

The preferred embodiments of the invention are described in conjunction with the attached figures that illustrate embodiments of the invention.

DETAILED DESCRIPTION OF THE INVENTION

The invention provides improved components on stabilizer pads, otherwise known as crane mats.

The invention is directed to a stabilizer pad that stabilizes equipment—e.g., cranes or vehicles with outriggers—during use as well as protects the ground surface on which the equipment is placed. While the stabilizer pad is shown and described as a rectangular shape, any shape is contemplated, e.g., square, circular, octagon, etc.

Figure 1:
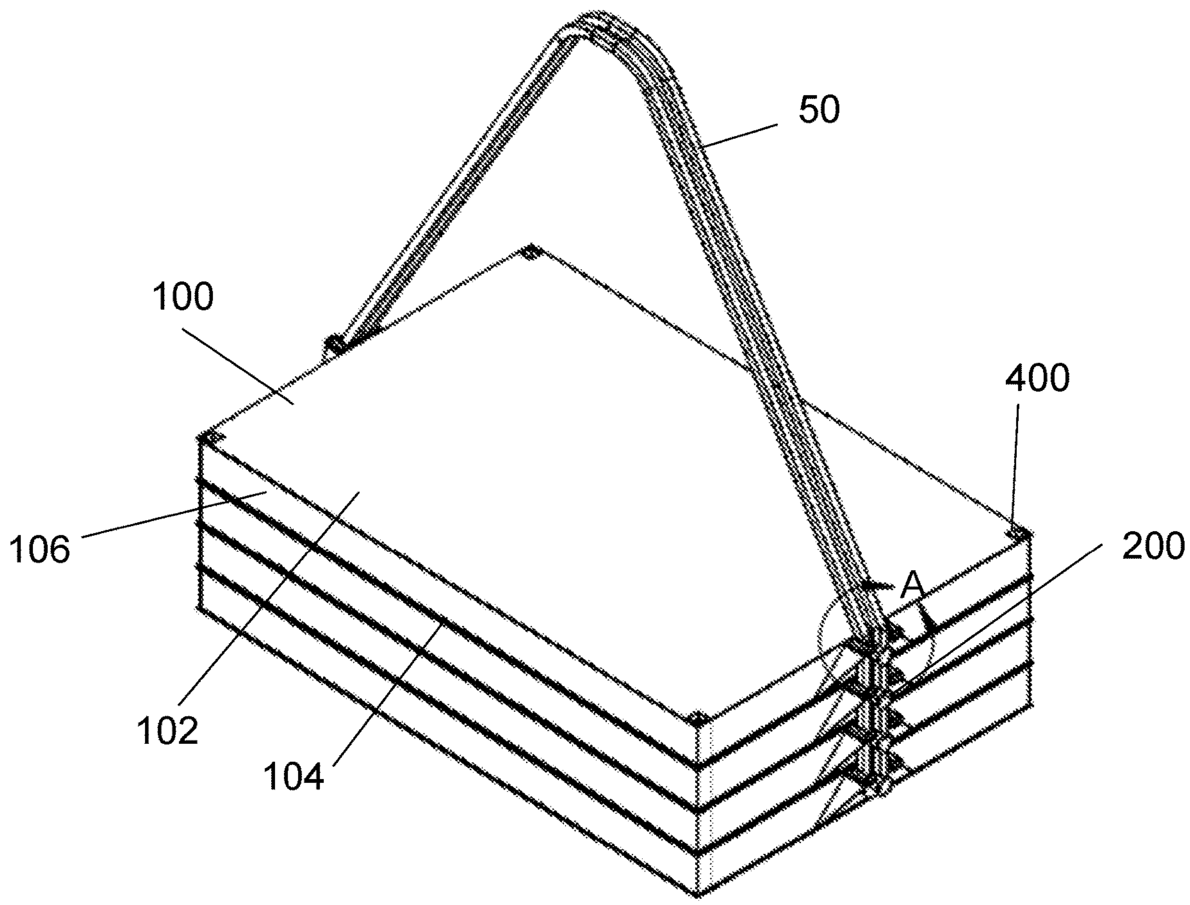
FIG. 1 illustrates a perspective view of stacked stabilizer pads hoisted using a strap.

The stabilizer pad 100 is rectangular platform component and includes a top surface 102, a bottom surface 104, and four sides surfaces 106. The pad 100 includes lifting components 200 and stacking components 400. As shown in FIG. 1, lifting components 200 are located on opposite sides of the pad. A stack of pads is hoisted or lifted by a crane hook using a strap 50, otherwise known as a choker or sling, typically made from yarn or woven materials of polyester. Strap 50 engages the lifting components on each mat as described more fully below.

Figure 2A:
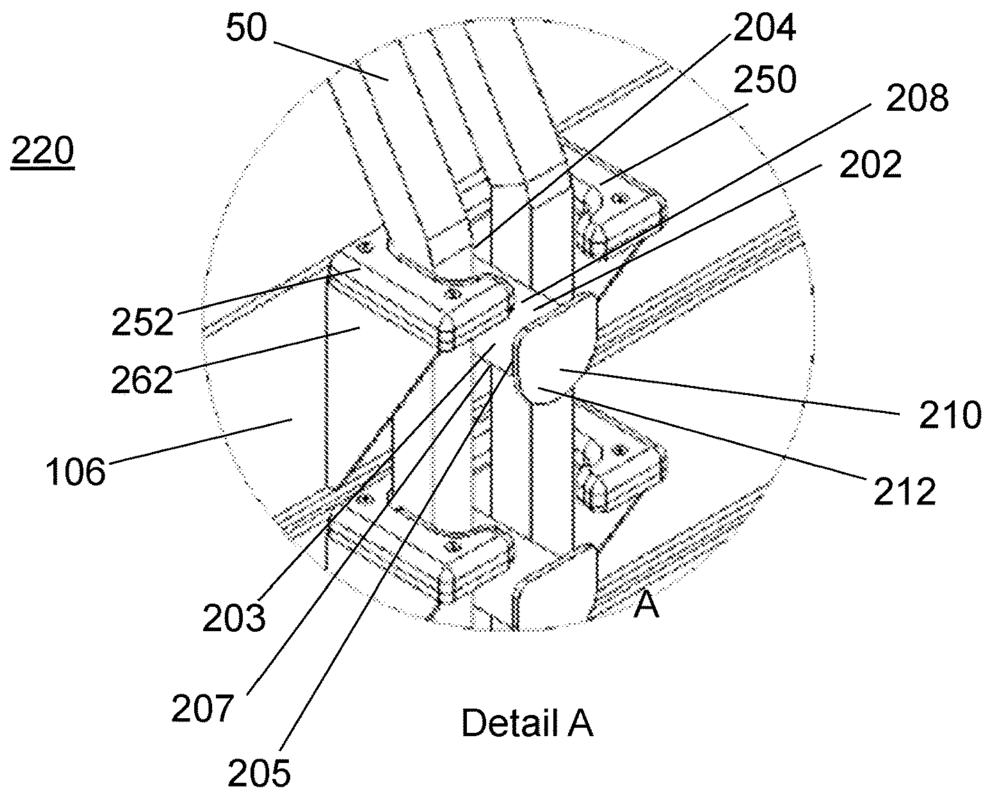
FIG. 2A illustrates a detailed view of a lifting component.
Figure 2B:
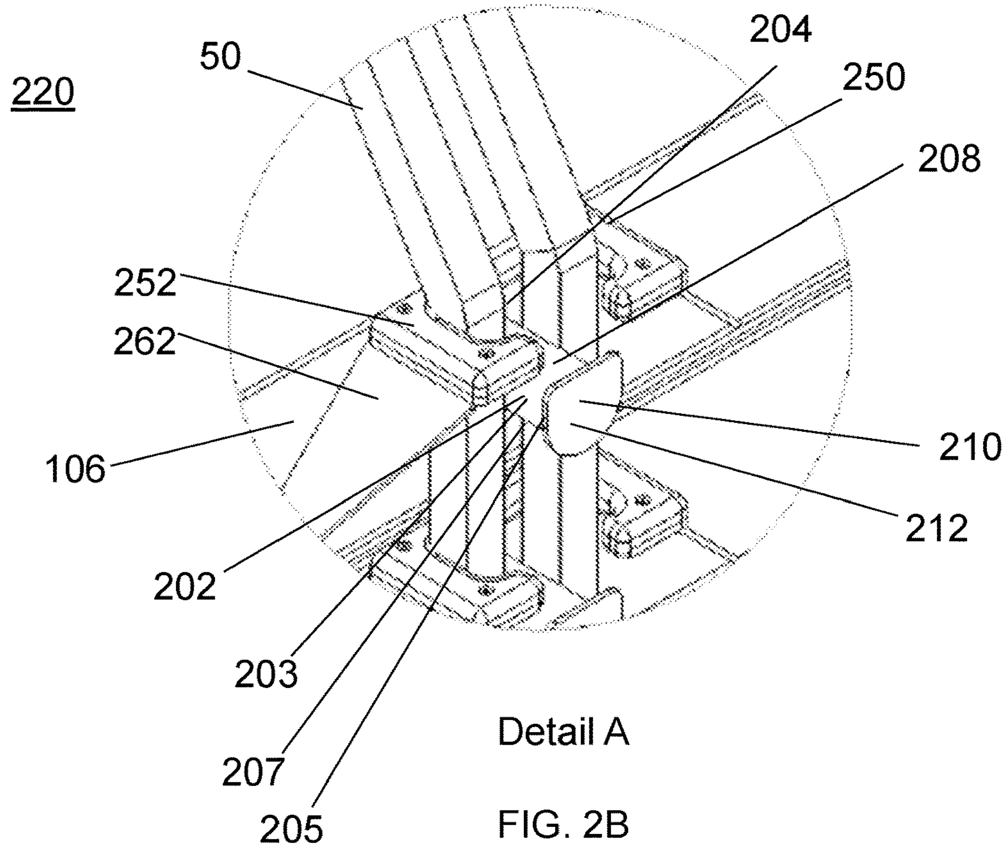
FIG. 2B illustrates a detailed view of a lifting component.

FIG. 2A and FIG. 2B illustrate embodiments of the lifting components 220 positioned on a side surface 106 of the pad. Specifically, the lifting components 220 each protrude outwardly from opposite side surfaces 106. The side surfaces 106 include no recessed portions.

The lifting components 220 may be made from any material, for example, steel, plastic, wood, nylon, rubber, foam, or any combination thereof, and attached or secured to the side surfaces 106. Furthermore, it is contemplated that portions of the lifting components 220 may be machined from the material the pad is constructed so that they are integrated. According to the embodiment in FIG. 2A and FIG. 2B, the lifting component 200 includes a trunnion element 202 and a guide component 250.

The trunnion element 202 protrudes outwardly from a side surface 106 and may be connected using any known connection method such as welding, hardware, or adhesive. The trunnion element 202 comprises a body portion 203 extending between a first end 204 attached to the one or more side surfaces 106 and a second end 205. The body portion 203 comprises a curved surface 207 connected to a flat surface 208. The curved surface enables the strap to easily slide and move around the trunnion element 202 during positioning. During lifting, the curved surface is easy for the strap to wrap around. This provides a continuous transition for the strap to connect with the pad stacked above.

A cap element 210 is connected to the second end 205 of the trunnion element 202, the cap element 210 is a flat plate member 212 with a diameter that is larger than the diameter of the trunnion element 202. The plate member 212 forms a boundary at the second end 205 of the trunnion element 202 that prevents the strap from sliding off the body portion 203.

Surrounding the trunnion element 202 is a guide component 250. The guide component 250 comprises a bracket element 252 and a gusset element 262.

Figure 3:
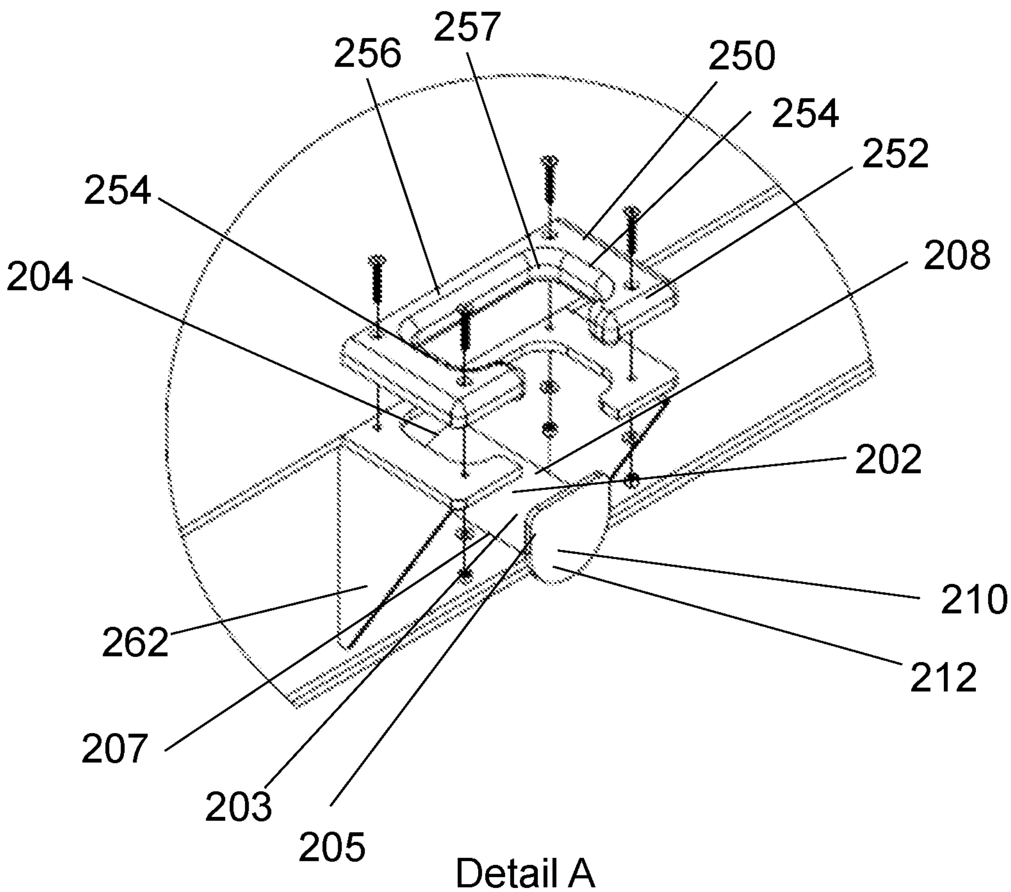
FIG. 3 illustrates an exploded detail view of a lifting component.

As shown in FIG. 3, the bracket element 252 is connected to the side surface 106 and positioned a distance above the trunnion element 202. The bracket element 252 protrudes outwardly from the side surface 106 and comprises two receptacle areas 254. The receptacle areas 254 are configured to contain and store the strap 50. The bracket element 252 cooperates with the curved surface 207 of the trunnion element 202 to maintain the strap in an interference hold, i.e., the edges of the strap are encased by the bracket element 252 and the trunnion element 202 as shown in FIG. 2A and FIG. 2B.

The bracket element 252 resembles a C-shaped configuration. The C-shaped configuration forms receptacle areas 254 that ensure that the strap is encapsulated within the bracket element 252 and prevents the strap from falling when the mats are not under a load, i.e., lifted.

As shown in FIG. 3, the bracket element 252 may further include a protective covering 256. The protective covering 256 is positioned on the top face of the bracket element 252 and may be secured using hardware as shown, or any other securement means such as adhesive. The protective covering 256 includes soft or curved edges 257 to protect the strap from damage. It is contemplated that the protective element may be made from a material different than the bracket component and may include materials such as rubber, foam, or plastic.

The gusset element 262 of the guide component 250 is connected to the bracket element 252. As shown in FIG. 2A, the gusset element 262 is located 90 degrees from the bottom face of the bracket 252. In FIG. 2A, the gusset element 262 is located at an angle from the bottom face of the bracket 252 between 0 and 90 degrees. The gusset elements 262 provide strength and support for the bracket element 252, particularly when under load and the strap exerts force on the bracket element 252 or if side loading occurs.

Figure 4:
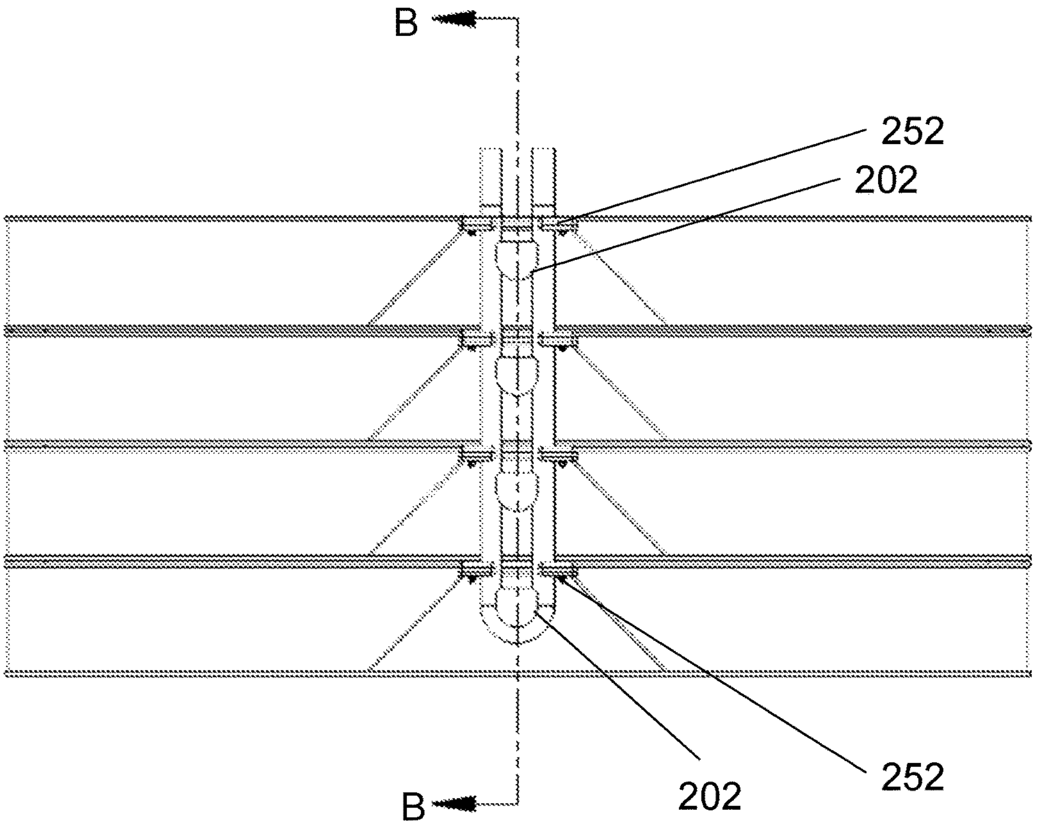
FIG. 4 illustrates a side view of stacked stabilizer pads.
Figure 5:
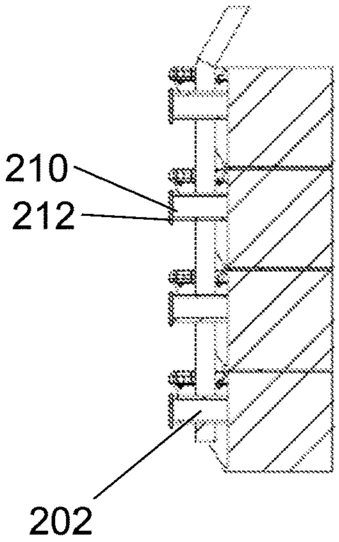
FIG. 5 is a cross-sectional detail view of lifting components on stacked stabilizer pads.

FIG. 4 and FIG. 5 illustrate stacked stabilizer pads with lifting components shown and described in FIG. 2B. When stacked, the lifting components of each pad are vertically aligned. The strap engages the trunnion element 202 of the bottom-most pad and is retained on either side of the trunnion elements 202 of the pads stacked above. Specifically, for the pads stacked above, the strap passes on both sides of the trunnion element 202 and between the bracket element 252.

FIG. 5 further illustrates the diameter of the flat plate member 212 of the cap element 210 larger than the diameter of the trunnion element 202. The plate member 212 prevents the strap from sliding off the trunnion element 202.

Figure 6:
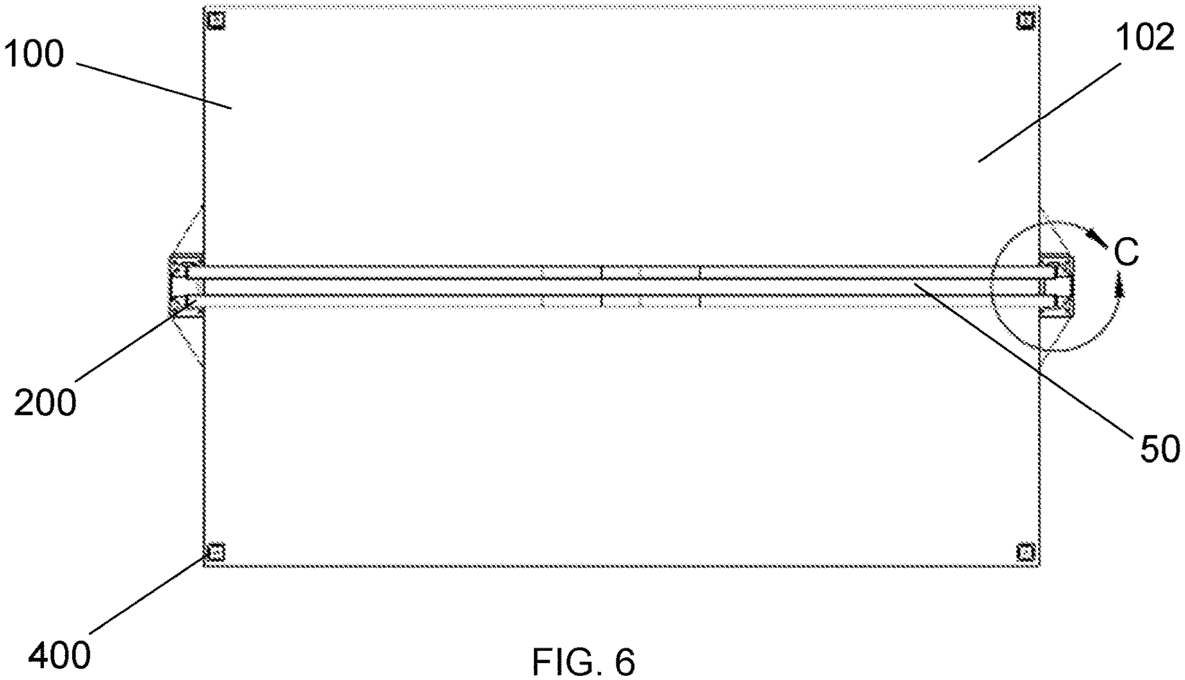
FIG. 6 illustrates a top view of the stabilizer pad including strap.
Figure 7:
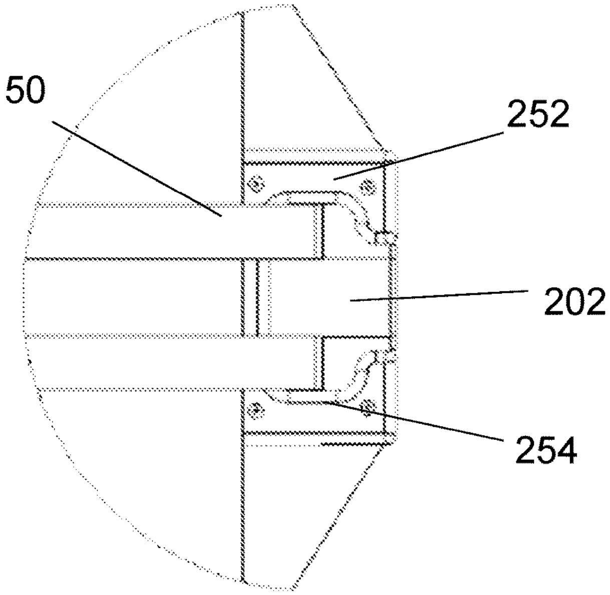
FIG. 7 illustrates a detailed view of a lifting component and strap.

FIG. 6 and FIG. 7 illustrate the bracket element 252 cooperating with the trunnion element 202 to maintain the strap in an interference hold. The edges of the strap are stored within the receptacle areas 254 so that they are encased by the bracket element 252 and the trunnion element 202.

The stabilizer pad 100 may further include stacking components 400 configured to be "nested" together—i.e., placed or stored one inside the other. The stacking components 400 assist with aligning mats when stacked upon each other and are used to cooperate with, guide into position, and securely hold an accompanying stabilizer pad.

The stacking components 400 comprise cavity elements 402 and pin elements 404. The pin element may be made from materials such as steel, wood, plastic, rubber, etc. The pin element 404 includes a band element 405 that extends around the pin element 404 and protrudes from the side surfaces of the pin element 404.

Figure 8A:
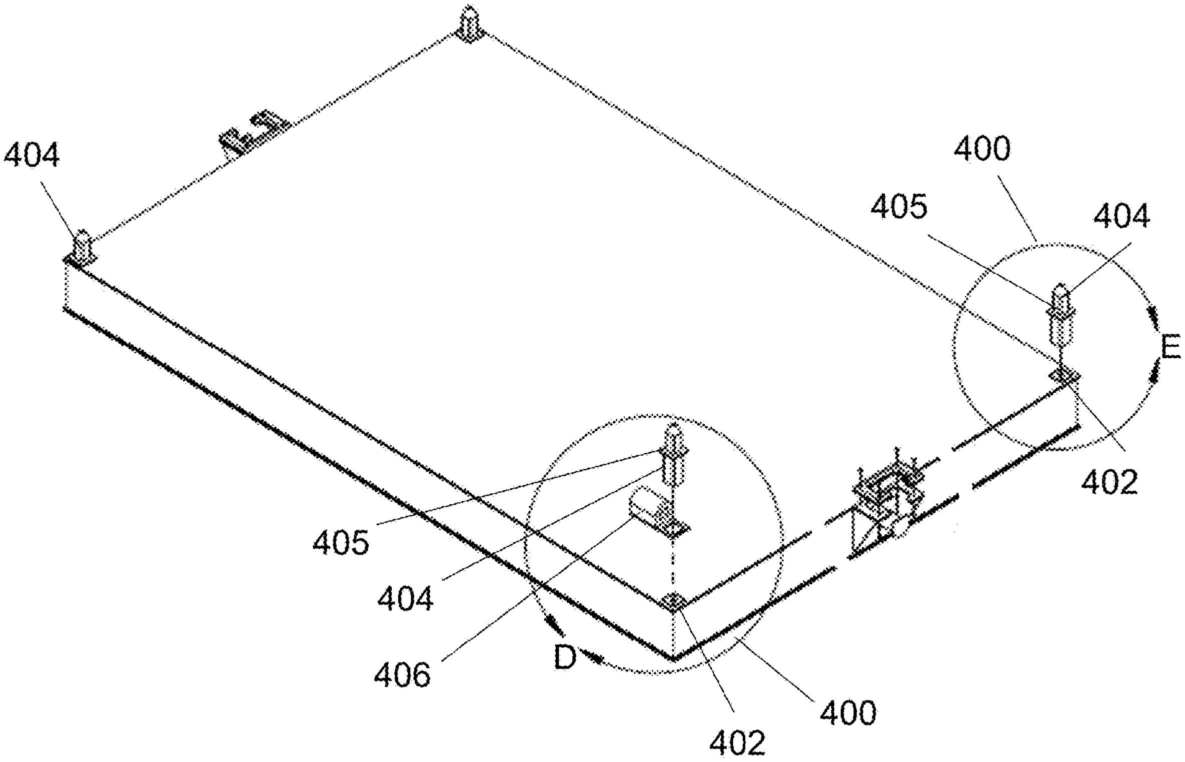
FIG. 8A illustrates a perspective view of a stabilizer pad including stacking components.
Figure 10:
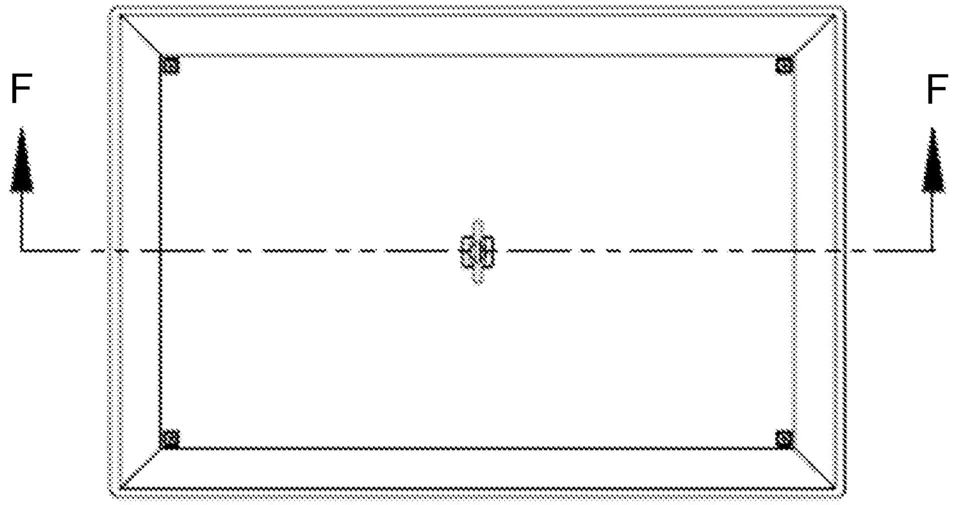
FIG. 10 illustrates a top view of a stabilizer pad with lifting component and rod.
Figure 12:
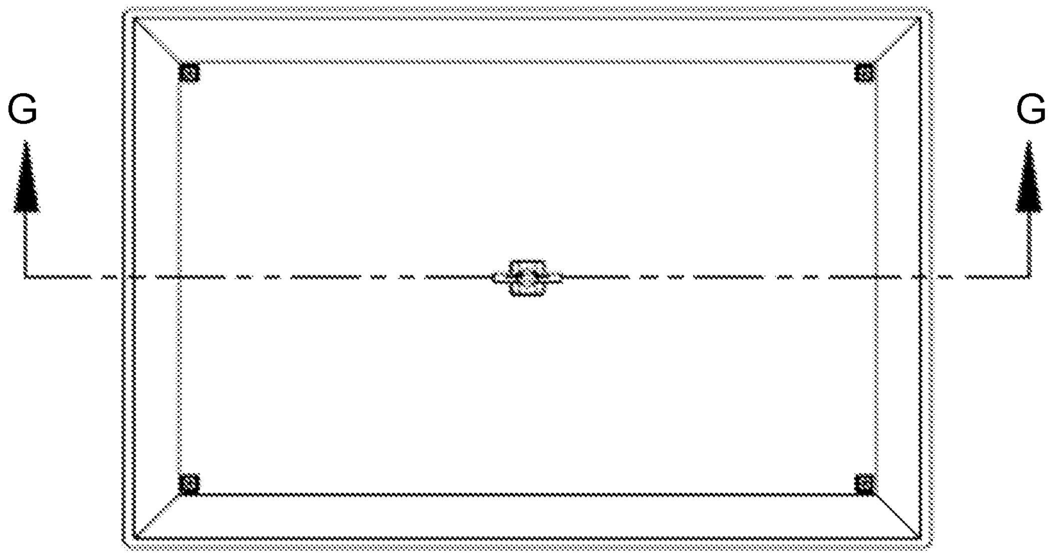
FIG. 12 illustrates a top view of a stabilizer pad with lifting component and rod.
Figure 14:
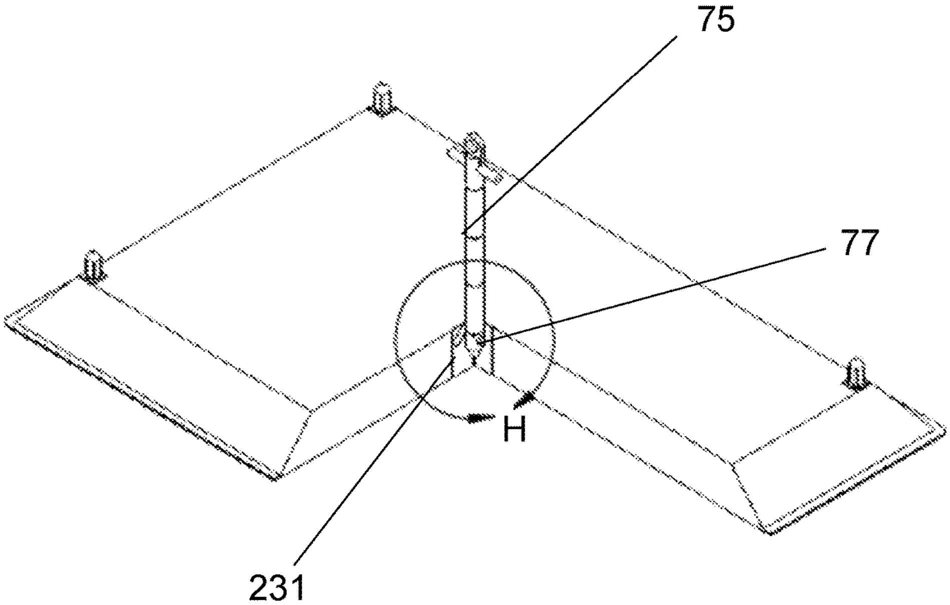
FIG. 14 illustrates a perspective view of a stabilizer pad with lifting component and rod.

Both the top surface 102 and bottom surface 104 of the platform component of the stabilizer pad 100 may include cavity elements 402 located at or near the corners of the pad 100 as shown in FIG. 8A (see also FIGS. 10, 12, 14). Although the cavity elements are shown as located near each corner of the pad, any number or arrangement of cavity elements is contemplated.

The cavity element 402 may be a continuous aperture through the entire pad including both top and bottom surfaces 102, 104. The cavity elements 402 on the top surface 102 are connected to the pin elements 404. The cavity elements 402 on the bottom surface 104 are configured to receive the pin elements 404.

Figure 8B:
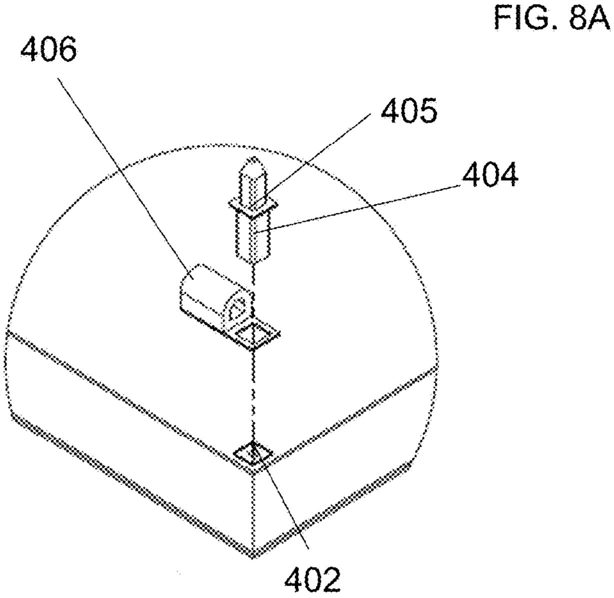
FIG. 8B illustrates a detailed view of a stacking component.
Figure 8C:
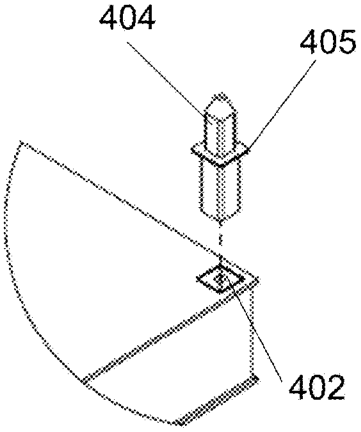
FIG. 8C illustrates a detail view of a stacking component.

As shown in FIG. 8B and FIG. 8C, pin elements 404 are connected to the cavity element 402 with the band element 405 positioning the stacking pin 400 in the cavity element 402 so that a portion of the pin 404 protrudes from the top surface 102. On the bottom surface 104, cavity elements 402 are configured to receive the protruded portion of the pin element 404 of the pad stacked beneath it. This ensures alignment of the mats.

Figure 8D:
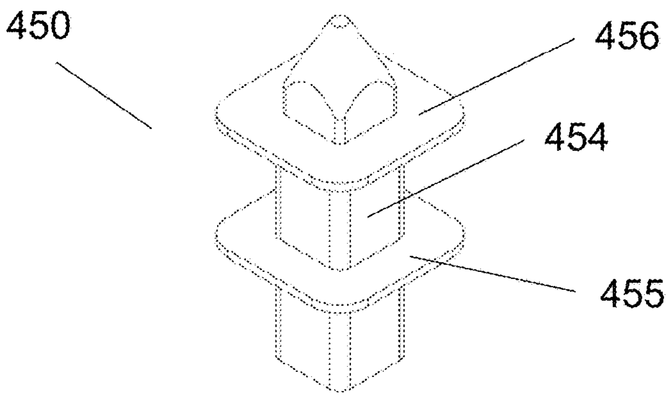
FIG. 8D illustrates a detailed view of a stacking component.

The stacking components 400 may further include a bumper element 406. The bumper element may be made from a material different than the pin element and may include materials such as rubber, foam, or plastic. The bumper element may be a separate element that is assembled to the pin element 404 before the pin 404 is inserted into the cavity element 402 as shown in FIG. 8B. Alternatively, the pin element and bumper element may be integrated as a unitary component as shown in FIG. 8D and FIG. 9B. For example, the bumper element may be in the form of a steel collar extending from the pin element.

Figure 8E:
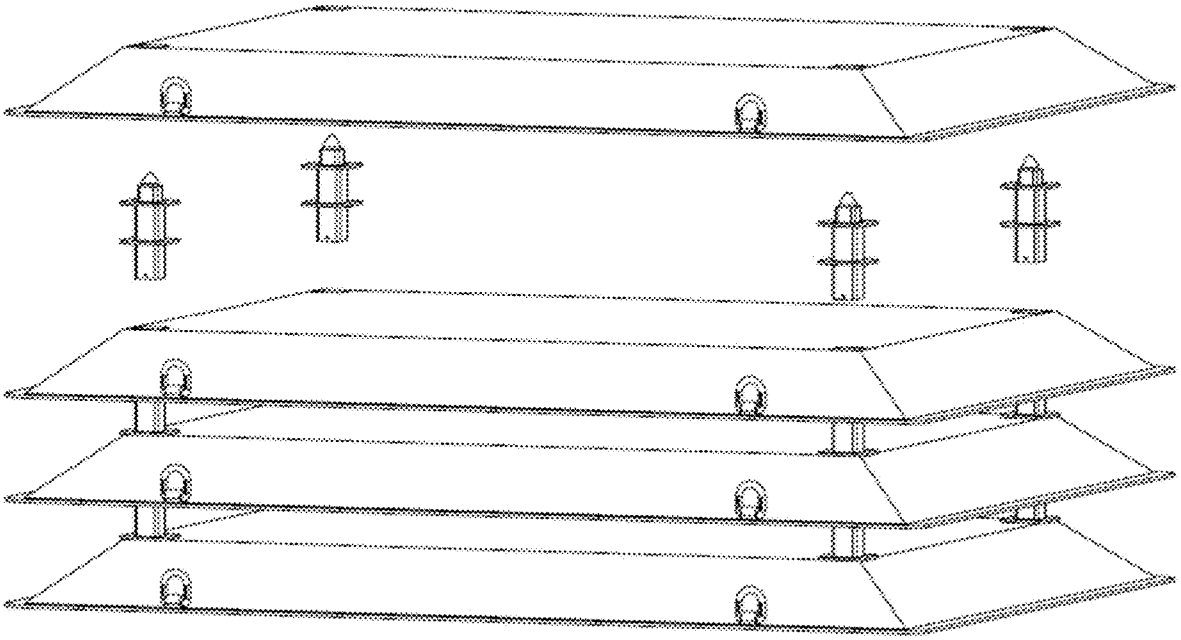
FIG. 8E illustrates a perspective view of stacked stabilizer pads.

As shown in FIG. 8D and FIG. 8E, stabilizer pads are stacked using stacking components 450 with a band element 455 and bumper element 456 integrated with the pin element 454. Pin element 454 is each located within the cavity element 402 as shown in FIG. 8B. The band element 455 positions the stacking component 400 in the cavity element 402 so that a portion of the pin element 454 protrudes from the top surface 102 of a pad. On the bottom surface 104 of a pad stacked on top, cavity elements 402 receive the protruded portion of the pin element 454 with the bumper element 456 positioning the stacked pad. Here, the pads are stacked with a distance between them to prevent them from touching one another.

Figure 9A:
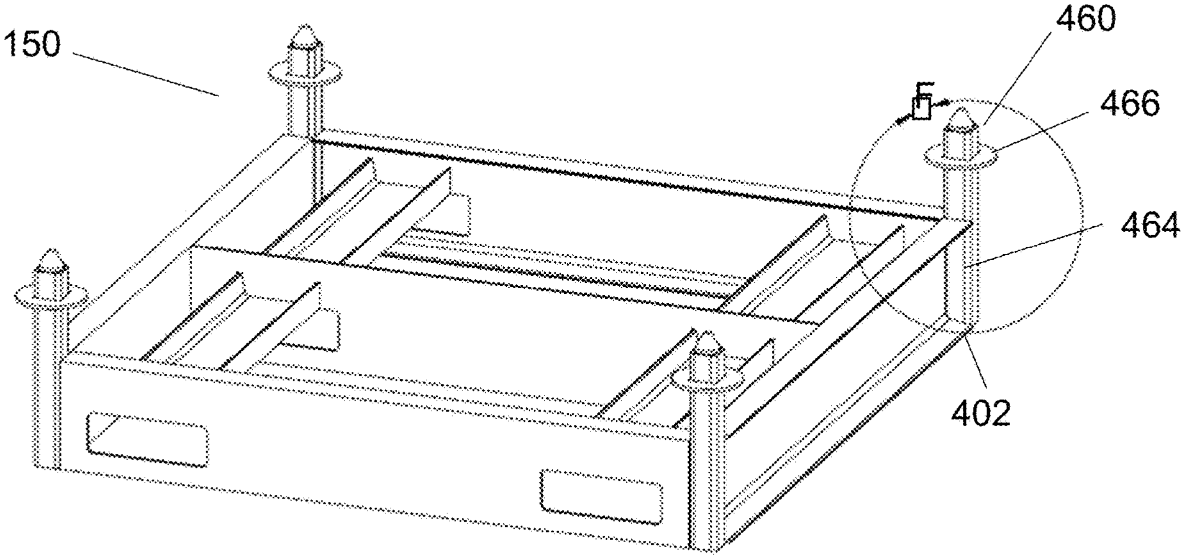
FIG. 9A illustrates a perspective view of integrated stacking components.
Figure 9B:
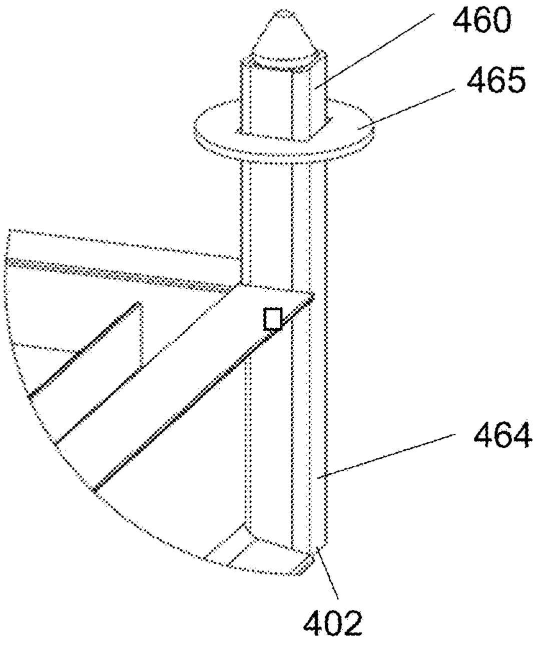
FIG. 9B illustrates a detailed view of an integrated stacking component.

As shown in FIG. 9A and FIG. 9B, the stacking component 460 includes a bumper element 466 integrated with the pin element 464. The pin element 464 with bumper element 466 is integrated with a rack 150 used as a base for stacking stabilizer pads.

The bumper elements 406, 456, 466 provide a surface for a stacked pad to rest upon. The bumpers 406, 456, 466 not only prevent crane mats from being directly stacked upon one another, but also creates a space between stacked mats, which may be utilized by a forklift machine to insert forks to lift and move one or more mats from the stack.

As shown in FIGS. 10, 11, 12, 13, the stabilizer pad 100 of the invention contemplates lifting components 200 that are used to cooperate with, guide into position, and securely hold a rod used to hoist the pad. In this embodiment, the lifting components may be centrally located and positioned through the top and bottom surfaces of the mat and used to encapsulate and securely interconnect with a lifting rod.

According to one embodiment, the stabilizer pad may include a centrally located lifting assembly 230. As shown in FIGS. 11-19C, the lifting assembly 230 is configured to engage a lifting rod component 75 that is used to hoist the stabilizer mats.

The lifting assembly includes a slot component 231 including a locking element 232 to receive and constrain the lifting rod 75 so that it may be used to hoist stabilizer mats. Many different embodiments are contemplated for the locking element 232.

Figure 15:
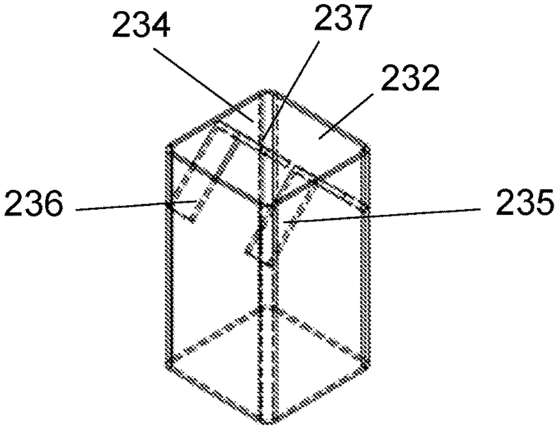
FIG. 15 illustrates a lifting component.
Figure 16:
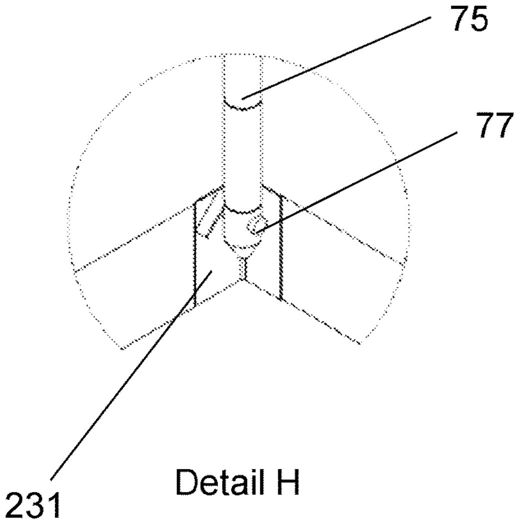
FIG. 16 illustrates a detailed view of the lifting component.

As shown in FIG. 15, a locking element 232 is a catch system 234 comprising two latches 235 separated by an opening. Each latch 235 includes a first arm 236 positioned approximately 45 degrees with a second arm 237. It is also contemplated that the opening created between the two latches 235 may be any measured size. According to this embodiment, the rod component 75 includes one or more protrusions 77 that interacts with the catch system 234.

Figure 11:
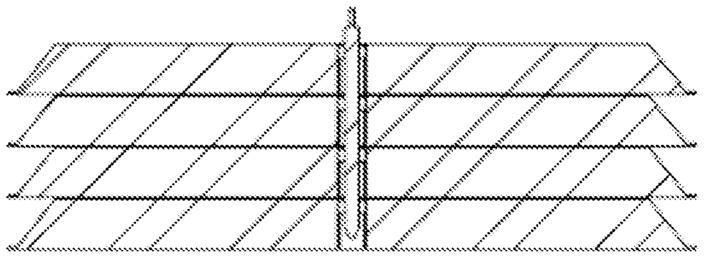
FIG. 11 is a cross-sectional detail view of the lifting component and rod.
Figure 13:
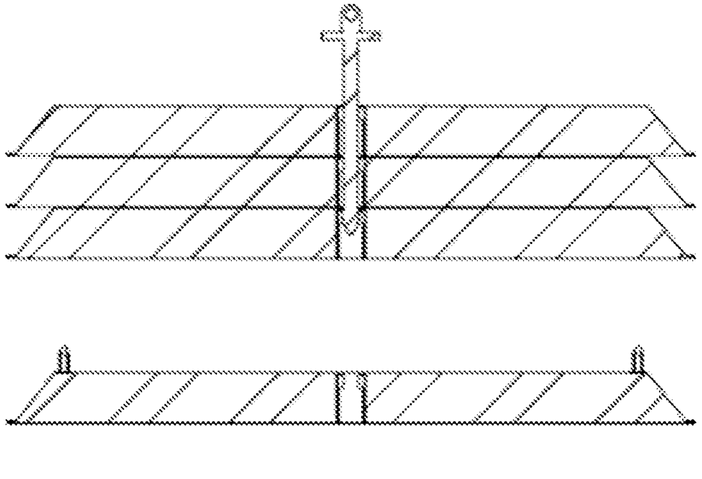
FIG. 13 is a cross-sectional detail view of the lifting component and rod.

The protrusions 77 may clear the latches 235 in one configuration while interfering with them in a second configuration. Specifically, the protrusions 77 are constrained by the catch system 234 to lift the mats. As shown in FIG. 11, the first position of the rod component 75 permits the protrusions 77 to pass through the opening between the latches 235. Once the desired depth is reached, i.e., the number of mats desired to be hoisted, the rod 75 is rotated 45 degrees so that, in a second position, the protrusions 77 get stopped, or caught, by the latches 235 when the rod component 75 is lifted as shown in FIG. 13, 14, and in detail in FIG. 16.

Another embodiment of the lifting components 230 centrally located on the pad is shown in FIGS. 17-19C. This embodiment includes a slot component 241 with locking element 242 to receive and constrain the lifting rod 75 so that it may be used to hoist stabilizer mats. According to this embodiment, the rod component 75 includes an end plate 78 that interacts with the catch system locking element 242.

Figure 17:
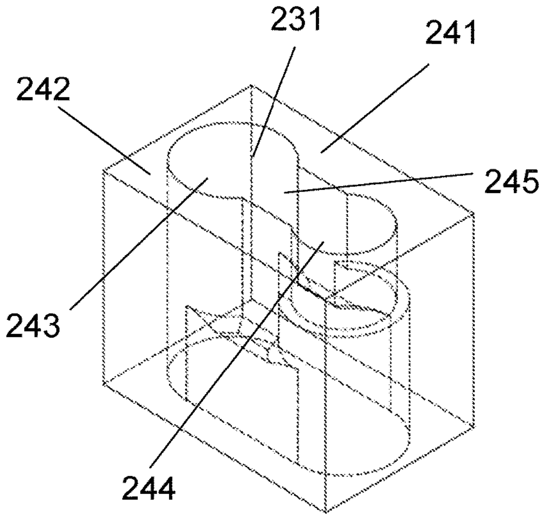
FIG. 17 illustrates a lifting component.
Figure 18A:
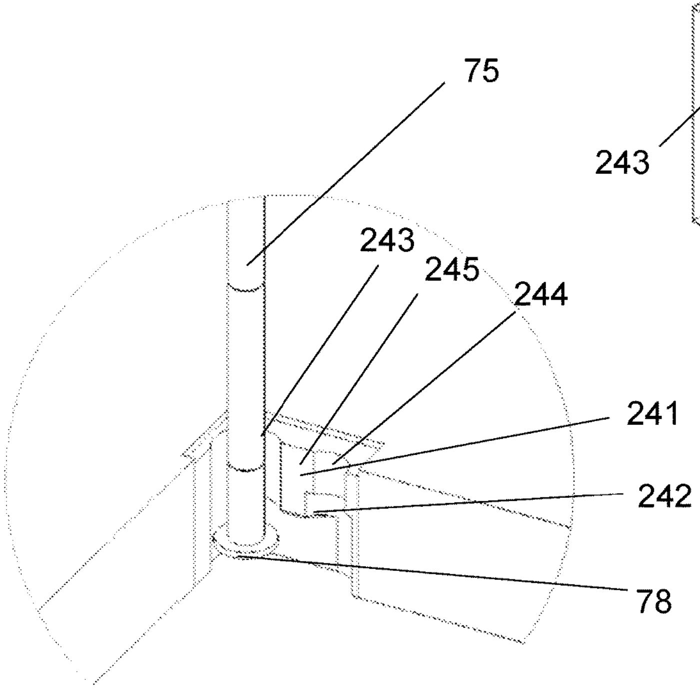
FIG. 18A illustrates a detail view of the lifting component with rod in a first position.
Figure 18B:
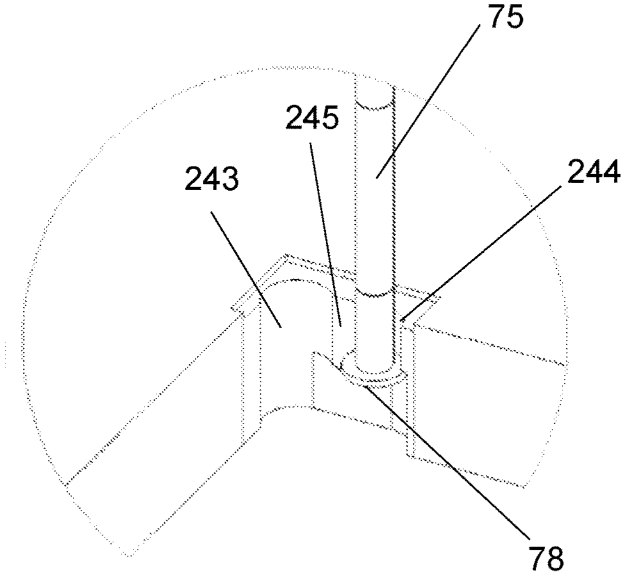
FIG. 18B illustrates a detailed view of the lifting component with rod in a second position.
Figure 19A:
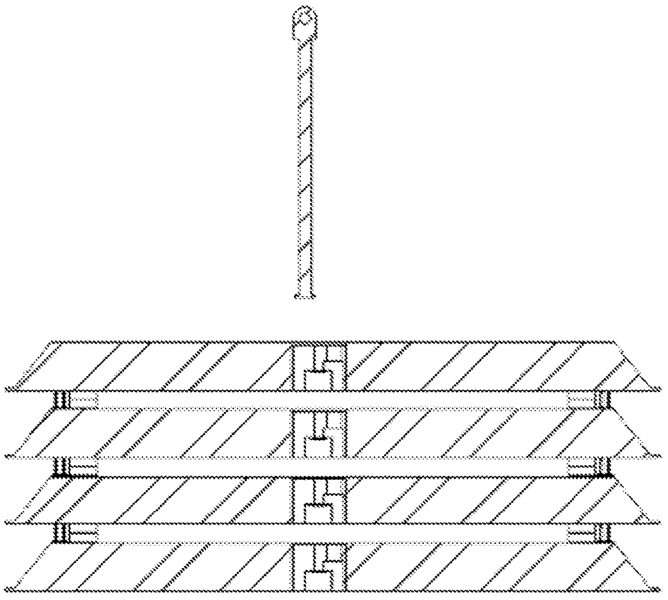
FIG. 19A is a cross-sectional view of the lifting component with a lifting rod.
Figure 19B:
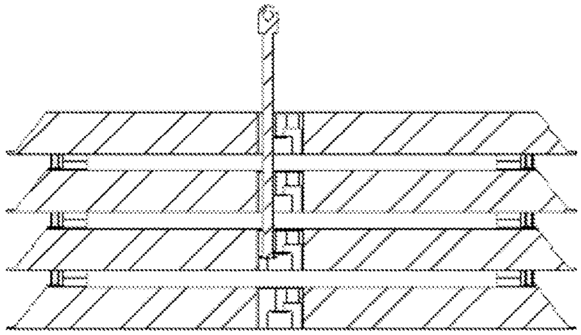
FIG. 19B is a cross-sectional view of the lifting component with a lifting rod in a first position.
Figure 19C:
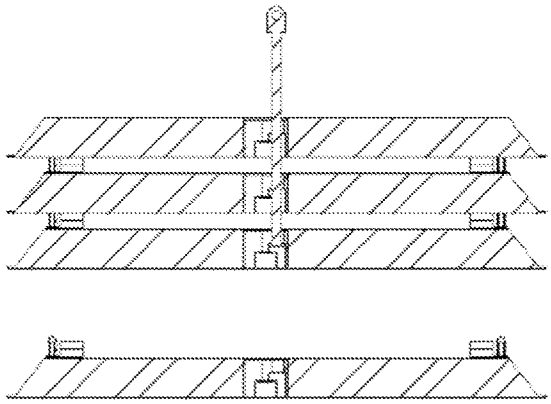
FIG. 19C is a cross-sectional view of the lifting component with rod in a second position.

As shown in FIG. 17, a locking element 242 comprises a first conduit 243 and a second conduit 244 joined by a channel opening 245. A diameter of the first conduit 243 is larger than a diameter of the second conduit 244. The lifting rod component 75 includes a plate 78. As shown in FIG. 19A, the rod 75 is positioned within the first conduit 243 of one or more pads. As shown in FIG. 19B, once the desired number of mats is reached, the rod 75 is translated within the channel opening 245 to the second conduit 244. As shown in FIG. 19C, the plate 78 is sized such that it is constrained by the diameter of the second conduit 244 to lift the one or more mats. It is also contemplated that the second conduit 244 may include a pocket feature into which the plate 78 may be constrained.

While the disclosure is susceptible to various modifications and alternative forms, specific exemplary embodiments of the invention have been shown by way of example in the drawings and have been described in detail. It should be understood, however, that there is no intent to limit the disclosure to the particular embodiments disclosed, but on the contrary, the intention is to cover all modifications, equivalents, and alternatives falling within the scope of the disclosure as defined by the appended claims.

The invention claimed is:

1. A stabilizer pad comprising:

a platform component including a top surface and a bottom surface, wherein the top surface and the bottom surface are joined by one or more non-recessed side surfaces, and two lifting assemblies each positioned on opposing side surfaces, wherein each lifting assembly comprises:

a trunnion element protruding outwardly from the side surface, and including a first end connected to the side surface and a second end, the trunnion element comprising a body portion extending between the first end and the second end and comprising a curved surface connected to a flat surface, a guide component connected to the side surface and including a bracket element, the bracket element positioned a distance above the trunnion element, the bracket element protruding outwardly from the side surface and comprising two receptacle areas.

2. The stabilizer pad according to claim 1, further comprising a cap element connected to the second end of the trunnion element, the cap element having a diameter larger than a diameter of the trunnion element.

3. The stabilizer pad according to claim 1, wherein the guide component comprises a protective element.

4. The stabilizer pad according to claim 1 further comprising one or more removable stacking pin elements.

5. The stabilizer pad according to claim 4 further comprising bumper elements that may be assembled to the one or more removable stacking pin elements.

6. The stabilizer pad according to claim 4 wherein the top surface of the pad further comprises cavity elements, each cavity element located at or near a corner of the pad, and the removable stacking pin elements configured to be located in the cavity elements.

7. The stabilizer pad according to claim 1 further comprising a gusset element connected to the bracket element.

8. The stabilizer pad according to claim 1 wherein the top surface of the pad further comprises cavity elements, each cavity element located at or near a corner of the pad.

9. The stabilizer pad according to claim 8 further comprising removable stacking pin elements configured to be located in the cavity elements.

10. The stabilizer pad according to claim 9 further comprising bumper elements that may be assembled to the one or more removable stacking pin elements.

11. A stabilizer pad comprising:

a platform component including a top surface and a bottom surface, wherein the top surface and the bottom surface are joined by a side surface, and a first lifting assembly positioned on the side surface;

a second lifting assembly positioned on the side surface and opposing the first lifting assembly;

each lifting assembly comprising:

a trunnion element protruding outwardly from the side surface, a guide component protruding outwardly from the side surface and positioned a distance above the trunnion element, the guide component comprising two receptacle areas.

12. The stabilizer pad according to claim 11, wherein the trunnion element comprises a body portion, the body portion comprising a curved surface connected to a flat surface.

13. The stabilizer pad according to claim 11, wherein an end of the trunnion element comprises a cap element.

* * * * *